United States Patent [19]

Korn

[11] 3,895,765

[45] July 22, 1975

[54] REEL TO REEL CARTRIDGE TAPE PLAYER SYSTEM

[75] Inventor: Hugo Korn, Chicago, Ill.

[73] Assignee: Motorola, Inc., Chicago, Ill.

[22] Filed: Nov. 19, 1973

[21] Appl. No.: 417,350

[52] U.S. Cl. .................................... 242/194; 360/94

[51] Int. Cl. ......................... G03b 1/04; G11b 15/32

[58] Field of Search .................................... 242/194, 198–200, 55.19 A, 192; 360/93–96; 274/4 B, 4 C

[56] References Cited

UNITED STATES PATENTS

| | | | |
|---|---|---|---|
| 3,570,780 | 3/1971 | Pastor | 242/194 |
| 3,594,008 | 7/1971 | Takagi | 360/94 |

*Primary Examiner*—Leonard D. Christian
*Attorney, Agent, or Firm*—Donald J. Lisa; James W. Gillman

[57] ABSTRACT

A magnetic tape device adapted to play both 8-track continuous loop cartridges and 8-track reel to reel cartridges includes a housing having a cartridge receiving opening and a reversible tape drive mechanism including a capstan and transducer head. A drawer, mounted within the opening and adapted to receive both continuous loop and 8-track reel to reel cartridges is slidably movable to hold the cartridge in playing and disengaging positions. The reel to reel cartridge includes two reels mounted coaxially within the cartridge with each of the reel rims protruding from the side of the cartridge. Upon insertion of the reel to reel cartridge into the magnetic tape device, the reel rims are engageable with a drive mechanism which engages a switch which activates the logic network of the tape device. A control lever, pivotally mounted to the housing and operatively connected to the drawer and drive mechanism, is movable between first and second positions to effect fast forward and rewind of the respective reels of the cartridge.

16 Claims, 8 Drawing Figures

REEL TO REEL CARTRIDGE TAPE PLAYER SYSTEM

BACKGROUND OF THE INVENTION

In the past, reel to reel tape player systems have been developed for use in playing cartridges known as cassettes. These tape player systems have utilized either a reel drive mechanism or a capstan drive mechanism. The reel drive mechanism drives the takeup reel either from the rim, the hub, or the shaft. Such a construction has resulted in a device wherein the takeup reel's rotational velocity is constant but the velocity of the tape across the transducer head varies with the amount of tape on the takeup reel. Attempts to provide a variable speed drive to eliminate this deficiency have resulted in variable speed drive mechanisms which are costly due to this complexity. Furthermore, attempts to apply a capstan drive system to a reel to reel 8-track cartridge have not been successful because there has not existed an 8-track cartridge having reel to reel tape transport that is compatible with a continuous loop 8-track magnetic tape device.

SUMMARY OF THE INVENTION

One object of this invention is to provide a reel to reel cartridge tape player system for use with 8-track reel to reel cartridges which can be used with 8-track continuous loop cartridges.

It is another object of this invention to provide an 8-track reel to reel cartridge wherein the reels are mounted coaxially within the cartridge and each of the reel rims protrudes from the cartridge.

It is still another object of this invention to provide a magnetic tape device having reel to reel tape transport and a constant speed capstan drive mechanism.

It is an additional object of this invention to provide a magnetic tape device having a reversible capstan drive mechanism and a selective reel to reel drive mechanism capable of playing and/or recording from a cartridge having two reels mounted coaxially within the cartridge.

In an embodiment of this invention, the magnetic tape device includes a housing having a cartridge receiving opening and drawer mounted within the opening adapted to receive a cartridge having two reels mounted coaxially therein with magnetic tape thereon. Each of the reels is independently driven and each of the reels has an outer rim protruding from the cartridge. The magnetic tape device includes a tape drive mechanism having a reversible capstan drive and capstan positioned to frictionally engage the tape within the cartridge to drive the same, and a transducer head positioned to be adjacent the tape in the cartridge for cooperating thereto. The drawer is slidably movable within the housing opening between a first position away from the tape drive mechanism and a second position holding the cartridge in playing position. A reel to reel drive mechanism having drive wheels is mounted to the tape device housing and is engageable with the reels protruding from the cartridge when the reel to reel cartridge is inserted into the drawer. Upon insertion of the cartridge into the drawer, the reel to reel drive mechanism engages a switch means which activates the capstan drive means to set the logic network to determine the capstan drive direction and the transducer head position. A control arm pivotally mounted to the player housing and operatively connected to the reel to reel drive mechanism is movable between a first position to effect movement of the tape in one direction by one of the drive wheels and a second position to effect movement of the tape in the opposite direction by the other drive wheel. Movement of the control means to either the first or the second position disengages the tape drive mechanism from the magnetic tape within the cartridge. When an 8-track continuous loop cartridge is inserted into the magnetic tape device, the reel to reel drive mechanism is not engaged by the cartridge and the capstan drive mechanism is locked in the playing position to play the continuous loop cartridge.

DETAILED DESCRIPTION

Figures 1, 2:
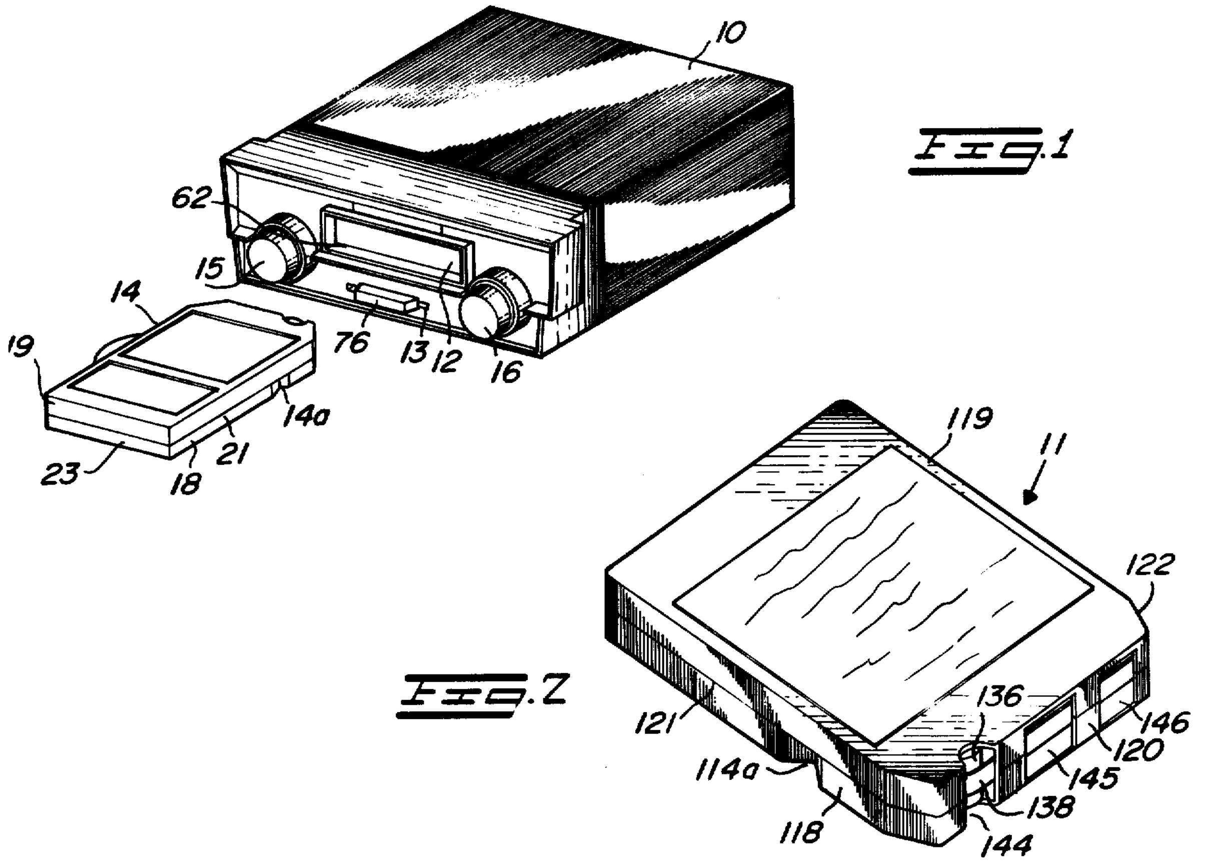
FIG. 1 is a perspective view of the tape player device and reel to reel cartridge constructed in accordance with the invention.
FIG. 2 is a perspective view of an 8-track continuous loop cartridge compatible with the tape player device in accordance with the invention.

Referring now to FIG. 1, there is seen a magnetic tape player, designated generally by a reference numeral 10, with an opening or entryway 12 for receiving, for example, a continuous loop 8-track single spool stereo cartridge 11 (FIG. 2) or a reel to reel 8-track type cartridge 14, the structure of which will be set forth in detail below. Control knobs 15 and 16 are provided to control the various functions of the tape player, as for example, volume control, tone control, balance control between respective channels. As will hereinafter be described, the opening 12 defines a cartridge drawer 62 which is slidably movable within the player 10 to hold the reel to reel 8-track type cartridge 14 in playing position.

Figure 3:
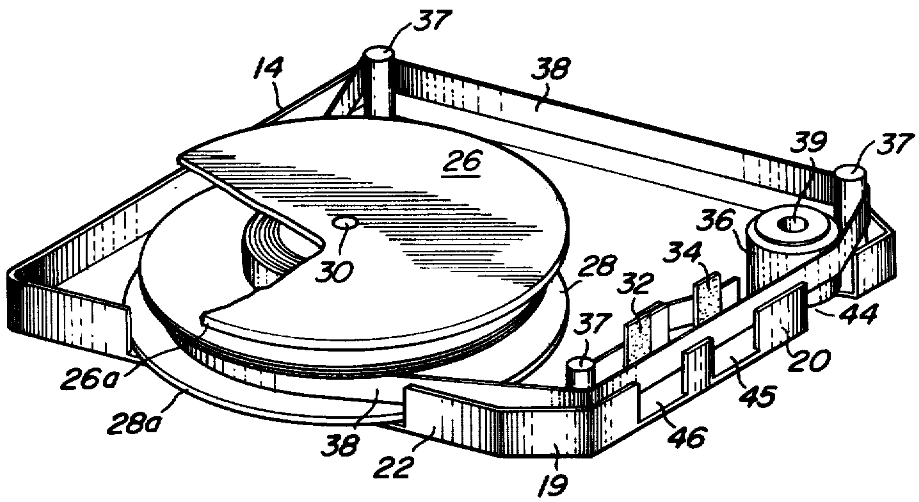
FIG. 3 is a perspective view of the reel to reel cartridge in accordance with the invention.
Figure 4:
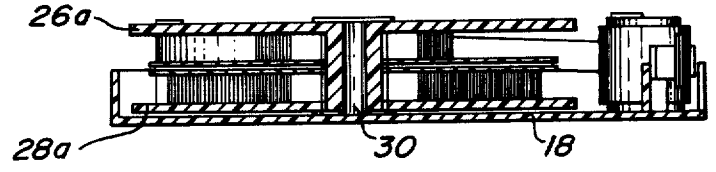
FIG. 4 is a cross-sectional view of the cartridge showing the reels and mounting in accordance with the invention.

The reel to reel 8-track type cartridge 14 as shown in FIGS. 1, 3 and 4, may be plastic and comprises a base or bottom portion 18 and a top portion 19 which are similar in configuration and which define a cavity within the cartridge housing. The cartridge 14 includes retainer notch 14*a* formed on one side thereof which receives a camming wheel or retainer element, as is well known in the art, to urge the cartridge into playing position. The general configuration of the cartridge 14 is a rectangular shape having a front wall 20, side walls 21 and 22 (FIGS. 1 and 3) and rear wall 23 (FIG. 1). Within the cartridge cavity, two reels 26 and 28 are mounted coaxially upon shaft 30 (FIG. 3). Each of the reels 26 and 28 are independently rotatable and each of the reels have outer rims 26*a* and 28*a* respectively which protrude through opening 25 in side wall 22 of the cartridge 14. The cartridge 14 is similar to a continuous loop 8-track single spool cartridge 11 (FIG. 2) in that canted guide posts 37 and integral pressure pads 32 and 34 and a pressure roller 36 are used to guide the magnetic tape 38 past the capstan shaft 40 and transducer head 42 (FIG. 5) of the magnetic tape player 10.

As shown in FIGS. 3 and 4, the reels 26 and 28 are mounted coaxially upon shaft 30. One end of the magnetic tape 38 is wound on reel 28 and a portion of the magnetic tape 38 is wound around guide post 37 past pressure pads 32 and 34 and around pressure roller 36 past guides 37 wherein the tape is attached to reel 26. The pressure roller 36 is freely mounted on shaft 39 and is permitted to rotate in either direction.

When the reel to reel 8-track type cartridge 14 is in operative position, opening 44 (FIG. 3) in front wall 20 permits the driving capstan 40 (FIG. 6) to abut against the pressure roller 36, opening 45 (FIG. 3) permits the transducer head 42 to engage the magnetic tape 38 and opening 46 permits the foil sensing switch contacts 48 to engage magnetic contacts on the ends of the magnetic tape, which through appropriate circuitry known to the art, reverses the capstan shaft and provides continuous play of the tape player 10. The drive of the capstan shaft abutting against the pinch roller 36 causes the magnetic tape 38 to be withdrawn from reel 28 around the guide post 37 and roller 36 and past the pressure pads 32 and 34 to be subsequently taken up by reel 26.

Figure 5:
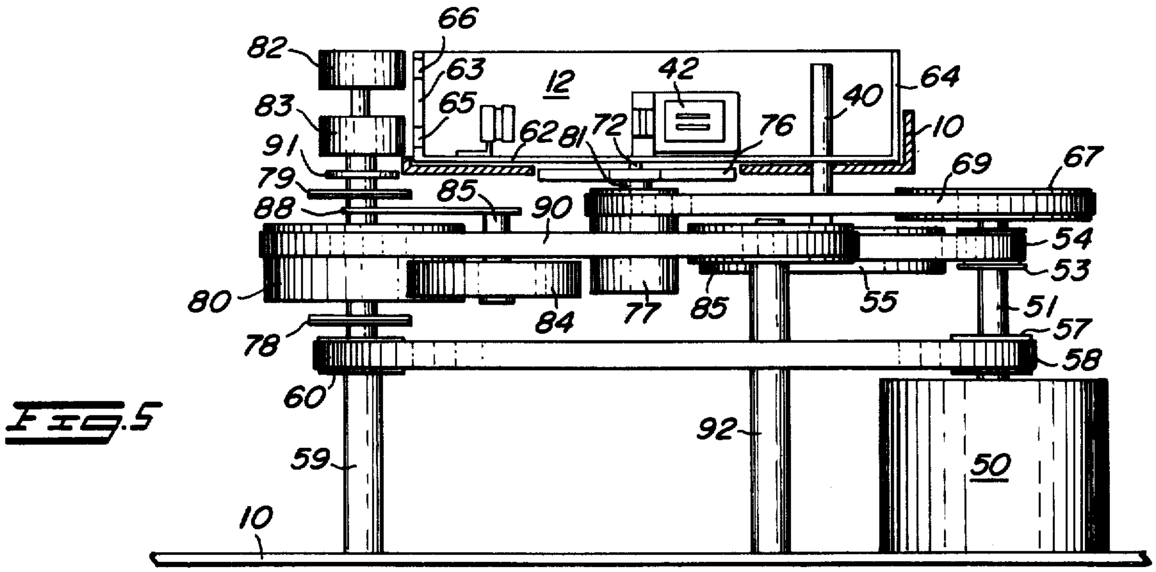
FIG. 5 is a cross-sectional view of the reel to reel drive mechanism in accordance with the invention.

With reference to FIG. 5, the capstan drive means of the instant invention includes a reversible motor 50, preferably mounted to the wall of the lower frame of the tape player housing 10, and a drive shaft 51 disposed upwardly having a capstan drive pulley 53 located intermediate its end. A capstan drive belt 54 couples the motor through drive pulley 53 to the capstan flywheel 55 to impart rotational motion to the capstan 40.

The motor drive shaft 51 is support for drive wheel 57 which is connected by drive belt 58 to a reel to reel drive wheel 60 mounted on a concentric shaft 59 journaled to the tape player housing 10. The reel to reel drive wheel 60 is supported on the concentric shaft 59 at a predetermined level, as illustrated in FIG. 5, as for example, by an appropriate shoulder on the shaft or other suitable means.

Figure 6:
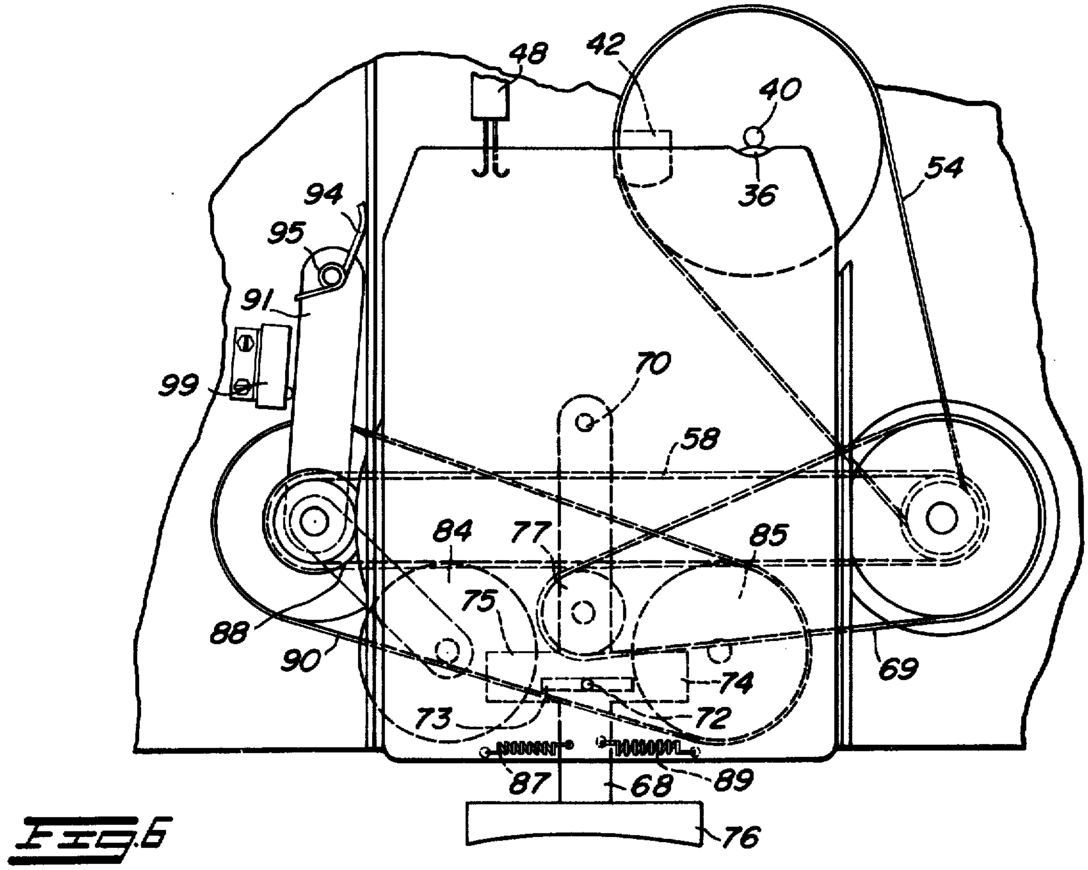
FIG. 6 is a top plan view of the reel to reel drive mechanism showing the engagement with the reel to reel cartridge in operative position in accordance with the invention.

The magnetic tape player 10 contains a cartridge receiving opening 12 into which continuous loop 8-track single spool cartridges 11 and reel to reel 8-track type cartridges 14 are inserted into playing position. The sides and base of housing opening 12 define a cartridge drawer 62 which is slidably movable within this opening 10 between a first position away from the tape drive mechanism and a second position holding the 8-track type cartridge 14 in playing position against the capstan 40 and transducer head 42. The cartridge drawer 62 contains side walls 63 and 64. Mounted to side wall 64 is a camming wheel or retainer element (not shown) which engages the indexing notch 14*a* of the reel to reel 8-track type cartridge 14 or the indexing notch 114*a* of the continuous loop 8-track single spool cartridge 11, as is well known in the art, to hold the same in playing position against the tape drive mechanism. Side wall 63 contains slotted openings 65 and 66 which extend in sufficient depth within the opening to permit the insertion of the reel to reel cartridge 14 into the cartridge drawer. The slotted openings 66 and 65 permit the reel rims 28*a* and 26*a* to protrude outwardly from the slotted opening respectively. A mode shift lever 68 (FIG. 6), for effecting the speed changing and reversing mechanism of the reel to reel drive mechanism is pivotally mounted by pin 70 to the housing 10. The mode shift lever 68 includes extensions 74 and 75 extending outwardly therefrom and a slotted opening 73 positioned perpendicular to the length of the lever 68 at extensions 74 and 75. A post 72 (FIGS. 5 and 6) is mounted to the base of drawer 62 and extends downwardly to rest within the slotted opening 73 in the mode shift lever 68. Springs 87 and 89 (FIG. 6) are provided to hold the mode shift lever 68 in a non-operative at rest position such that post 72 is positioned intermediate the ends of slotted opening 73 when the reel to reel cartridge 14 and drawer 62 are in the play position (FIG. 6). Intermediate the ends of the mode shift lever 68, a mode shift idler wheel 77 is mounted downwardly from the mode shift lever 68 on shaft 81. The mode shift idler wheel 77 is connected by drive belt 69 to the drive wheel 67 mounted to the motor drive shaft 51. For convenience, the mode shift lever 68 contains a handle 76 which extends outwardly from the tape player housing 10 through oppening 13 (FIG. 1) to permit manual operation of the speed changing and reversing mechanism.

As shown by FIG. 5, the reel to reel drive mechanism for effectuating the fast forward and reverse of the magnetic tape within reel to reel 8-track type cartridge 14 includes a concentric shaft 59 mounted to the tape player housing 10 and a drive wheel 60 which is connected by drive belt 58 to drive wheel 57 on the motor drive shaft 51. Positioned above drive wheel 60 on concentric shaft 59 is a first clutch means 78, a speed changing and reversing drive wheel 80, a second clutch means 79 and a pair of rubber faced spool drives 82 and 83. Spool drives 82 and 83 are aligned adjacent to openings 66 and 65 in the side 63 of the cartridge drawer 62. Additionally, an idler roller 84 is mounted by shaft 86 to an arm 88 which is attached to concentric shaft 59 between the second clutch means 79 and drive wheel 80. The idler roller 84 engages the speed changing and reversing drive wheel 80. Drive wheel 80 is connected by belt 90 to idler roller 85 which is journaled on shaft 92 attached to the tape player housing 10. The spaced idler rollers 84 and 85 are so positioned within the player such that when the mode shift idler wheel 77 is in the at rest position, idler wheel 77 does not contact either of the idler rollers 84 and 85 (as shown in FIG. 6).

Figure 7:
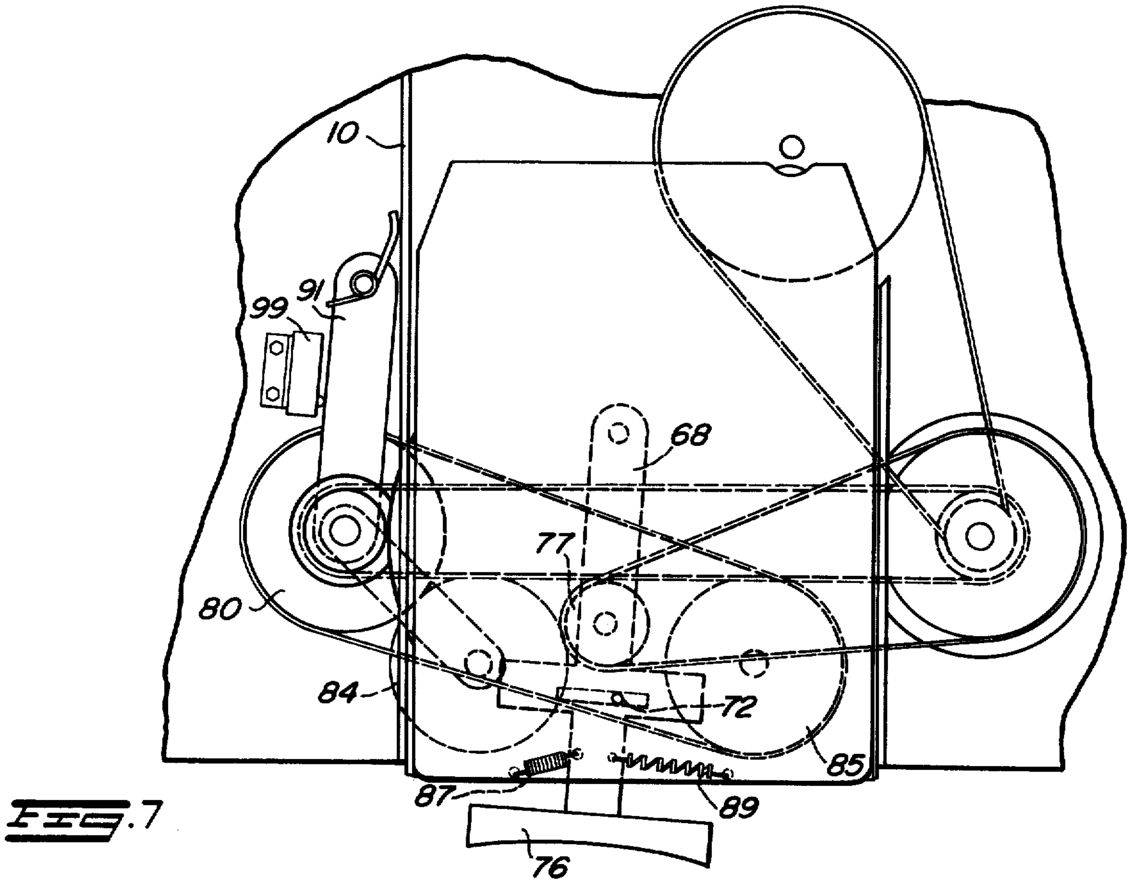
FIG. 7 is a top plan view of the reel to reel drive mechanism with the reel to reel cartridge shown in a disengaged position.

As shown in FIGS. 5, 6 and 7, an arm 91 is pivotally mounted to concentric shaft 59 between spool drive 83 and the second clutch means 79 and attached to the player housing 10 by utilizing an anchor means 95. A spring retention member 94 engages the arm 91 to bias the arm and the reel to reel drive mechanism toward the side wall 63 of drawer 62.

Figure 8:
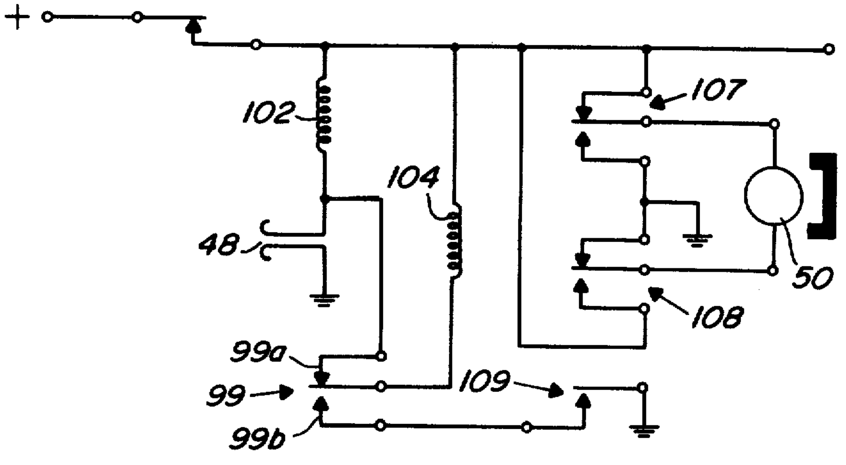
FIG. 8 is a schematic diagram illustrating the electrical structure of the switching arrangement and logic system of the invention.

FIG. 8 is a schematic diagram which illustrates the electrical structure of the switching arrangement and logic system of the instant invention. For example, the foil sensing switch contacts 48 are connected in series with a solenoid 102 which activates the cam indexing means (not shown). The contacts 48 are activated when the foil on the magnetic tape 39 contacts the foil sensing contact 48 to shift the transducer head to play the next track on the magnetic tape. A reel to reel sensing switch 99, a single pole, double throw contact switch is mounted within the tape player 10 and engaged by arm 91 when a reel to reel cartridge 14 is inserted into drawer 62. The movable contact of switch 99 is at this time contacting stationary contact 99*a*. Upon insertion of a continuous loop cartridge into drawer 62, the movable contact of switch 99 is connected to stationary contact 99*b*. Connected in series to sensing switch 99 is a solenoid 104 which activates the motor drive direction to properly index the drive direction regardless of the type of cartridge that has been inserted into the tape player. The drive direction of the reversible motor 50 is accomplished by utilizing direction switches 107, 108 and 109 which are activated by solenoid 104. Switches 107 and 108 are single pole, double throw contact switches which are ganged together with switch 109 and movable with respect to sensing switch 99. Switches 107, 108 and 109 are in fact bistable requiring activation of solenoid 104 to change their state.

FIG. 2 shows a continuous loop 8-track single spool cartridge 11 which comprises a base portion 118 and a top portion 119 which are similar in configuration and which define a cavity having a single spool (not shown) of endless magnetic tape 138, as is well known in the art. The general configuration of the single spool cartridge 11 is a rectangular shape and includes side walls 121 and 122 and a front wall 120. Front wall 120 includes an opening 144 which permits the driving capstan 40 to abut against a pressure roller 136 located within the cartridge 11, an opening 145 which permits the transducer head 42 to engage the endless magnetic tape 138 and an opening 46 which permits the foil sensing switch contacts 48 to engage magnetic contacts on the magnetic tape to shift the transducer head 42 to the next tape track, a technique well known in the art. The single spool cartridge 11 includes a retainer notch 114*a* formed on one side thereof which receives a camming wheel or retainer element connected to side wall 64 of drawer 62, as is well known in the art, to urge the cartridge 11 into playing position.

When a continuous loop 8-track single spool cartridge 11 is inserted into opening 12 of tape player 10 onto the drawer 62, spool drives 82 and 83 will not be contacted by side wall 122 of the cartridge and, therefore, arm 91 will not engage the reel to reel sensing switch 99. Under this condition, the motor drive 50 is unidirectional and the capstan drive is locked in the playing position. Thus, the logic system which determines the type of cartridge to be played in the player 10 and the direction of the capstan drive is dependent upon the reel to reel sensing switch 99.

When a reel to reel 8-track type cartridge 14 is inserted into opening 12 of tape player 10 onto the drawer 62, the outer rims 28*a* and 26*a* of the reels 28 and 26 protrude through openings 66 and 65 of side wall 22 to engage spool drives 82 and 83. This engagement between the spool drives 82 and 83 and the outer rims 28*a* and 26*a* displaces the speed changing and reversing mechanism to the left wherein arm 91 engages the reel to reel sensing switch 99 which activates the reel to reel logic network to determine the capstan drive direction and/or head position necessary to effect continuous play of the reel to reel cartridge 14.

Once inserted, a pre-recorded tape plays until the foil on the magnetic tape engages sensing contacts 48 to reverse the motor 50 and capstan drive and to index the transducer head 42 to the next tape track. The tape then plays in the opposite direction until the foil again contacts the sensing contacts 48 and the motor 50 and capstan drive is again reversed and the transducer head indexes again to play the next channel on the tape.

The speed changing and reversing mechanism is such that the mode shift idler wheel 77 is continuously driven by motor 50 through output shaft 51 and drive wheel 67 by belt 69. Because the motor 50 is reversible, both the output shaft 51 and the idler wheel 77 rotate in either direction. When the output shaft 51 of motor 50 is driven in one direction, this drive motion is transferred to the reel to reel drive means by drive wheel 57 mounted on shaft 51 connected by belt 58 to the reel to reel drive wheel 60. The mutually spaced idler roller wheels 84 are positioned within the player housing 10 such that their axis of rotation is parallel to that of the motor output shaft 51 and the mode shift idler wheel 77.

If we assume that motor 50 is operating in a counterclockwise direction, the capstan will be rotating in a counterclockwise direction, thus drawing the magnetic tape from reel 28 onto reel 26 and the mode shift idler roller will be rotating in a counterclockwise direction. To effect rewind of the magnetic tape onto reel 28 from reel 26, the mode shift lever 68 is moved to the left (FIG. 7) such that mode shift idler wheel 77 contacts and drives idler wheel 84 to drive the speed changing and reversing drive wheel 80 in a counterclockwise direction. The movement of the mode shift lever 68 to the left results in slotted opening 73 urging post 72 and drawer 62 outwardly such that a detent action occurs and cartridge 14 is disengaged from the capstan drive mechanism. The counterclockwise rotation of wheel 80 together with the first and second clutch means 78 and 79, reverses spool drives 82 and 83 such that the magnetic tape 39 will be rewound onto reel 28 from reel 26. The first clutch means 78, connected to spool drive 83, and the second clutch means 79, connected to spool drive 82, provide that each of the reels 26 and 28 can be independently driven at different speeds, as is known in the art. When the mode shift lever 68 is returned by spring 89 to its non-operative position, the engagement of post 72 with slotted opening 73 urges the drawer 62 and cartridge 14 into playing position against the capstan 40. The disengagement of the mode shift idler wheel 77 from idler wheel 84, results in the disengagement of the speed changing and reversing drive wheel whereby the first and second clutch means 78 and 79 are reversed and spool drives 82 and 83 are driven by the reel to reel drive wheel 60.

To effect fast forward of the tapes within cartridge 14, the mode shift lever 68 is moved to the right such that the mode shift idler wheel 77 contacts idler wheel 85. Idler wheel 85 is connected by belt 90 to the speed changing and reversing drive wheel 80. If we assume the motor is operating in a counterclockwise direction, the first and second clutch means 78 and 79 would not reverse the directional drive of spool drives 82 and 83 against reel rims 28*a* and 26*a*. The movement of the mode shift lever 68 to the right causes drawer 62, through the detent action of post 72 in slotted opening 73, to move outwardly, thereby disengaging the cartridge from the capstan drive mechanism.

What has been described is a tape player system which utilizes a capstan drive mechanism and a reel to reel drive mechanism which tape player is capable of playing continuous loop 8-track single spool cartridges and reel to reel 8-track type cartridges.

I claim:

1. In a magnetic tape device having a housing with an opening adapted to receive a cartridge having magnetic recording tape therein, a tape drive mechanism including a capstan positioned to frictionally engage the tape within the cartridge to drive the same, and a transducer head positioned to be adjacent the tape in the cartridge for cooperating therewith, the combination including, a cartridge having two reels mounted coaxially therein with magnetic tape thereon, each of said reels being independently rotatable and having an outer rim protruding from said cartridge, drawer means adapted to receive and hold said cartridge, said drawer means being slidably movable in the housing opening between a first position for holding said cartridge away from the tape drive mechanism and a second position to hold said cartridge in playing position against the tape drive mechanism, drive means within the housing including a portion positioned to engage said reels protruding from said cartridge, and selectively engageable with said reels to drive a selected one of said reels, switch means actuated by said portion of said drive means for controlling the operation of said drive means, and control means movably mounted to said housing and engageable with said drawer means and operatively connected to said drive means, said control means being movable between a first position to cause movement of the tape in one direction by engagement of said drive means with one of said reels and a second position to effect engagement of said drive means with the other one of said reels to cause movement of the tape in the opposite direction, said control means acting through said drawer means to disengage said magnetic tape within said cartridge from the tape drive mechanism.

2. The magnetic tape device according to claim 1 wherein said drive means includes a pair of drive spools positioned to engage said reels protruding through said cartridge and selectively engageable with said reels to drive a selected one of said reels.

3. The magnetic tape device according to claim 2 wherein said drive means further includes a drive wheel operatively connected to a reversible motor means and a speed changing and reversing drive wheel operatively connected with a pair of spaced idler wheels positioned in said housing, each of said drive wheels and said pair of drive spools being mounted on a concentric shaft within said housing, said spaced idler wheels being selectively engageable with said control means to drive a selected one of said drive spools.

4. The magnetic tape device according to claim 3 wherein said drive means further includes first and second clutch means mounted on said concentric shaft and operatively connected to said speed changing and reversing drive wheel for speed changing and reversing said drive spools in a predetermined direction.

5. The magnetic tape device according to claim 1 wherein said control means includes a mode shift lever mounted to said housing and engageable with said drawer means and having an idler roller mounted thereon and operatively connected to a reversible motor means, said mode shift lever being movable between a first position to cause movement of the tape in one direction by engagement of said drive means with one of said reels and a second position to effect engagement of said drive means with the other of said reels to cause movement of the tape in the opposite direction, said control means acting through said drawer means to disengage said magnetic tape within said cartridge from the tape drive mechanism.

6. The magnetic tape device according to claim 5 wherein said control means includes spring means operatively connected to said mode shift lever to bias the mod shift lever from said first or second position to a non-operative position.

7. The magnetic tape device according to claim 1 wherein said drawer means further includes a side wall having slotted openings therein to permit said reels protruding from said cartridge to engage said drive means.

8. A magnetic tape cartridge adapted for use in a magnetic tape device which includes a cartridge receiving opening, and a bidirectional tape drive mechanism including a capstan and transducer head, said cartridge comprising in combination, a housing having spaced apart top and bottom portions and side and end walls and having a plurality of openings in one of said end walls, one of the openings for receiving the transducer head to cooperate therewith and one of the openings for receiving the capstan to frictionally engage the tape therein, said housing further having an opening in one of said side walls;

a central shaft mounted in said housing;

two rotatable reels mounted coaxially on said central shaft between which the magnetic tape extends, each of said reels being bidirectionally rotatable and each having at least one outer rim protruding through said opening in said side wall and extending outwardly of the cartridge beyond said side wall; and means for guiding the tape from one of said reels past the transducer receiving opening and past the capstan receiving opening back to the other of said reels.

9. A magnetic tape cartridge of claim 8 further including a bidirectionally rotatable pressure roller mounted therein adjacent to said opening which receives the capstan for cooperation with said capstan to drive the magnetic tape past the transnducer head, and the tape on the two reels therein being wound in opposite directions and being guided from the one reel past the transducer and capstan receiving openings once and onto the other reel.

10. In a magnetic tape device for playing either a first type cartridge having a single spool mounted therein with a continuous loop of magnetic tape thereon, or a second type cartridge having two reels mounted coaxially therein with magnetic tape thereon, each of the reels being independently rotatable and each having an outer rim protruding from the cartridge, the device including:

a housing with an opening adapted to receive either cartridge;

a first drive means within the housing including a capstan positioned to frictionally engage the tape within the cartridge to drive the same;

a second drive means within the housing including a portion positioned to engage the outer rims of the reels protruding from the second type cartridge and selectively engageable with the outer rims to drive a selected one of the reels;

drawer means adapted to receive and hold a selected one of the first and the second type cartridges in playing position, the drawer means being slideably movable in the housing between a first position for holding the selected cartridge away from the first tape drive means and a second position for holding the selected cartridge in playing position against the capstan of the first drive means; and control means movably mounted to the housing and engageable with the drawer means and operatively connected to the second drive means, the control means being movable between a first position to cause movement of the tape in one direction by engagement of the second drive means with the outer rim of one of the spools and a second position to effect engagement of the drive means with the outer rim of the other of the drive spools to cause movement of the tape in the opposite direction, the control means acting through the drawer means to disengage the magnetic tape within the second type cartridge from the first drive means.

11. The magnetic tape device according to claim 10 wherein the second drive means includes a pair of drive spools positioned to engage the rims of the reels protruding through the second type cartridge and selectively engageable with the rims thereof to drive a selected one of the reels.

12. The magnetic tape device according to claim 11 wherein the second drive means further includes a drive wheel operatively connected to a reversible motor means and a speed changing and reversing drive wheel operatively connected with a pair of spaced idler wheels positioned in the housing, each of the drive wheels and the pair of drive spools being mounted on a concentric shaft within the housing, the spaced idler wheels being selectively engageable with the control means to drive a selected one of the drive spools.

13. The magnetic tape device according to claim 12 wherein the second drive means further includes first and second clutch means mounted on the concentric shaft and operatively connected to the speed changing and reversing drive wheel for speed changing and reversing the drive spools in a predetermined direction.

14. The magnetic tape device according to claim 10 wherein the control means includes a mode shift lever mounted to the housing and engageable with the drawer means and having an idler roller mounted thereon and operatively connected to a reversible motor means, the mode shift lever being movable between a first position to cause movement of the tape within the second type cartridge in one direction by engagement of the second drive means with one of the reels thereof and a second position to effect engagement of the second drive means with the other of the reels to cause movement of the tape in the opposite direction, the control means acting through the drawer means to disengage the magnetic tape within the second type cartridge from the tape drive mechanism.

15. The magnetic tape device according to claim 14 wherein the control means includes spring means operatively connected to the mode shift lever to bias the mode shift lever from the first or second position to a non-operative position.

16. The magnetic tape device according to claim 10 wherein the drawer means further includes a side wall having slotted openings therein to permit the rims of the reels protruding from the second type cartridge to engage the second drive means.

* * * * *